United States Patent
Fratello et al.

(10) Patent No.: US 6,842,997 B1
(45) Date of Patent: Jan. 18, 2005

(54) PIVOTAL DRYER NOZZLE FOR CAR WASH EQUIPMENT AND METHODS FOR DRYING VEHICLES

(75) Inventors: Daniel A. Fratello, Golden, CO (US); Dennis McCadden, Wheat Ridge, CO (US); Tuan Truong, Denver, CO (US)

(73) Assignee: Mark VII Equipment, LLC, Arvada, CO (US)

( * ) Notice: Subject to any disclaimer, the term of this patent is extended or adjusted under 35 U.S.C. 154(b) by 0 days.

(21) Appl. No.: 10/793,254

(22) Filed: Mar. 3, 2004

(51) Int. Cl.[7] .................................................. F26B 7/00
(52) U.S. Cl. ............................. 34/418; 34/443; 34/487
(58) Field of Search .......................... 34/418, 443, 487, 34/666; 15/405, 302

(56) References Cited

U.S. PATENT DOCUMENTS

| | | | | |
|---|---|---|---|---|
| 3,806,985 A | * | 4/1974 | Takeuchi | 15/307 |
| 3,994,041 A | * | 11/1976 | Barber | 15/302 |
| 4,335,526 A | * | 6/1982 | Smith | 34/229 |
| 4,934,018 A | * | 6/1990 | Fortier et al. | 15/312.1 |
| 4,949,423 A | * | 8/1990 | Larson et al. | 15/316.1 |
| 5,454,136 A | * | 10/1995 | Gougoulas | 15/312.1 |
| 5,557,820 A | * | 9/1996 | Belanger et al. | 15/1.51 |
| 6,000,095 A | * | 12/1999 | Johnson | 15/316.1 |
| 6,735,884 B2 | | 5/2004 | Fratello et al. | 34/487 |
| 6,745,497 B2 | * | 6/2004 | McElroy | 34/666 |

* cited by examiner

Primary Examiner—Stephen Gravini
(74) Attorney, Agent, or Firm—Dorsey & Whitney LLP

(57) ABSTRACT

Methods of blow drying vehicles with two or three superimposed dryers mounted for linear movement along the length of a vehicle include blow dryers having either fixed or pivotal nozzles so that air can be blown at the vehicle in predetermined patterns that have been found to more efficiently dry the vehicle. Further, a pivotal nozzle system is disclosed wherein a frustoconical nozzle is pivotally mounted on a horizontal axis for reciprocating movement by a linear actuator so that the nozzle can be oriented in desirable positions for effecting the drying operations described in the disclosed methods.

13 Claims, 12 Drawing Sheets

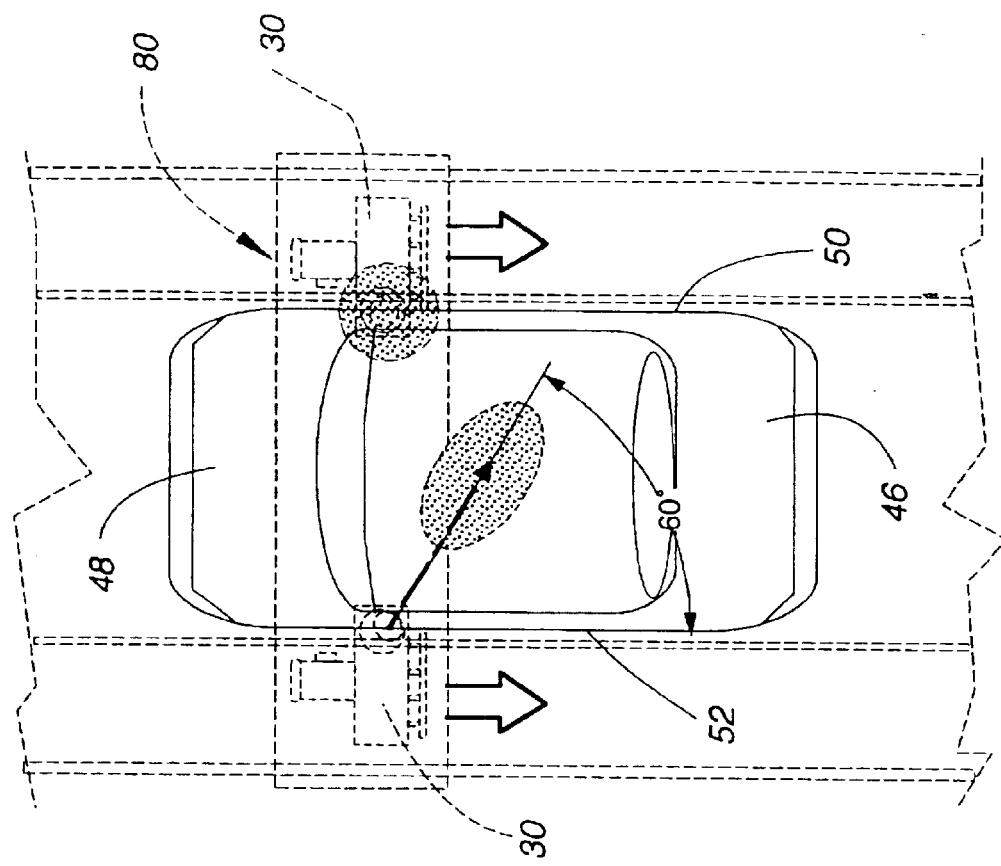
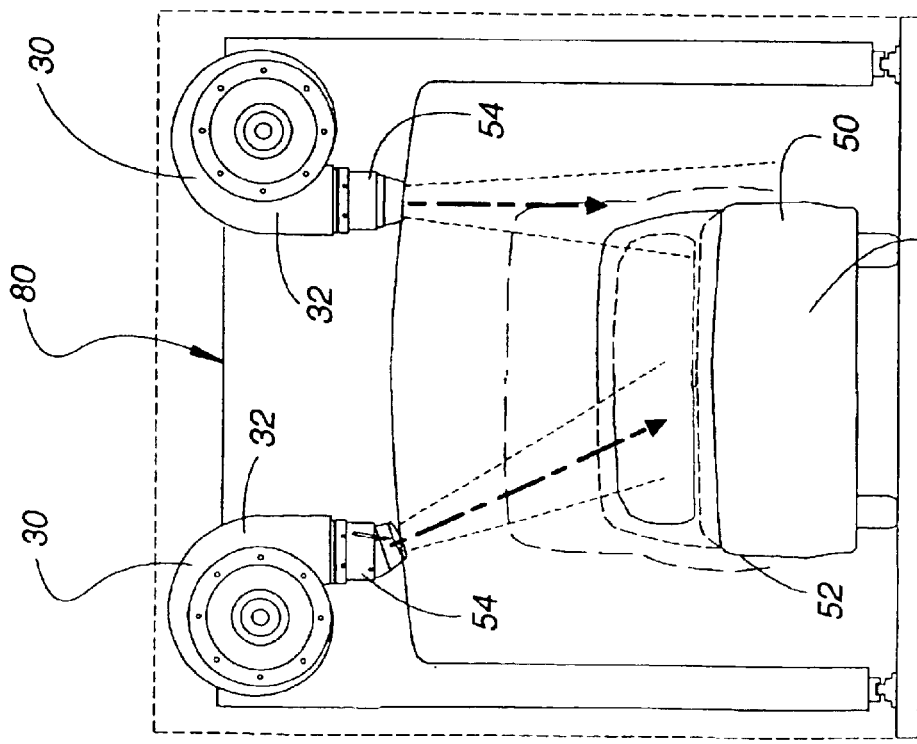
Fig. 12
Fig. 11

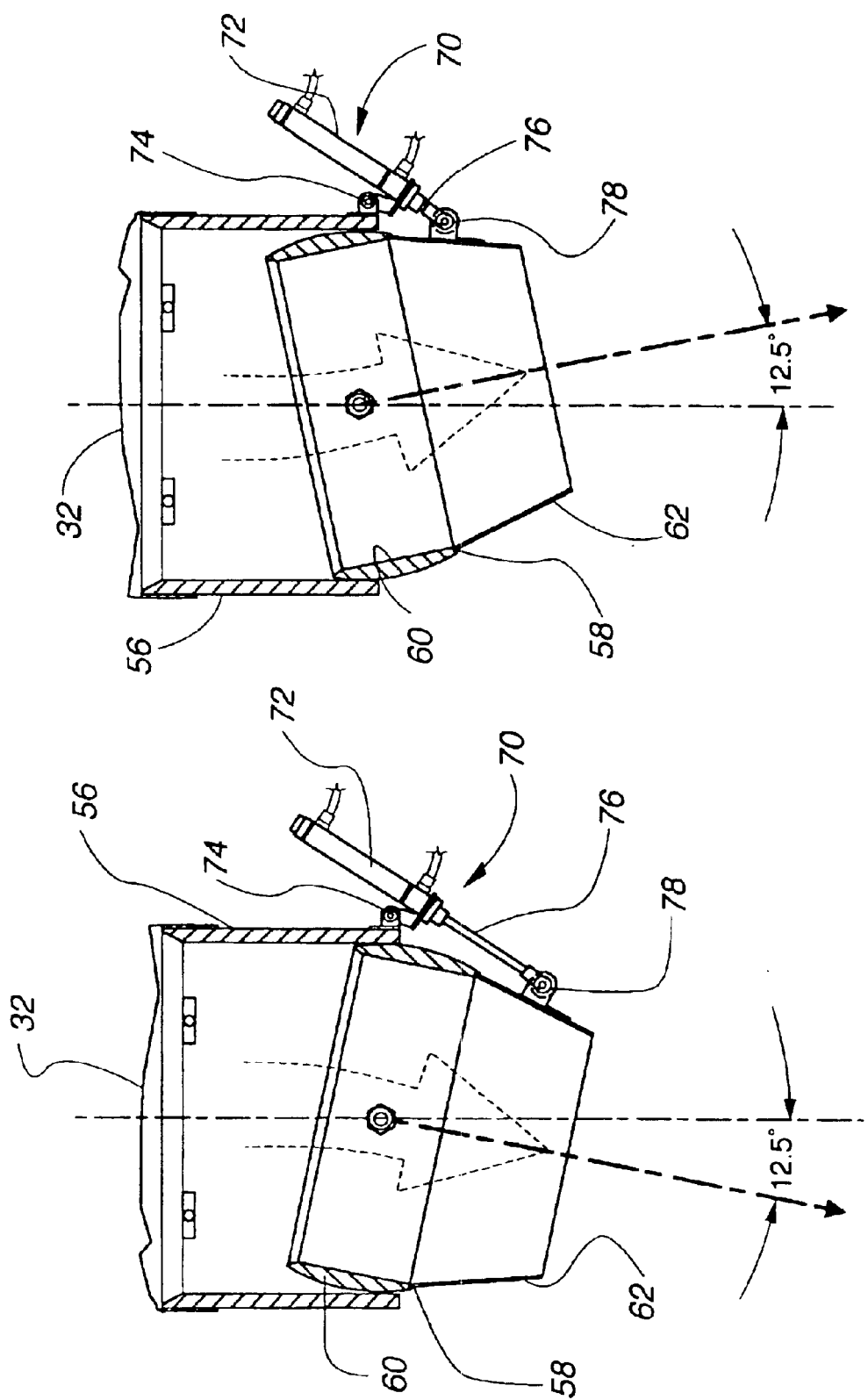

PIVOTAL DRYER NOZZLE FOR CAR WASH EQUIPMENT AND METHODS FOR DRYING VEHICLES

BACKGROUND OF THE INVENTION

1. Field of the Invention

The present invention relates generally to automated vehicle drying systems and more specifically to a new and improved pivotal blow drying nozzle and to methods of drying vehicles with and without using same.

2. Description of the Relevant Art

Automated apparatuses for washing automotive vehicles have become popular as a way of quickly washing a vehicle. The systems have assumed numerous configurations including tunnel-type washes wherein a plurality of wash apparatuses are longitudinally aligned for washing a vehicle that is moved therebeneath. Another common form of automatic system is a gantry-type system where the vehicle remains stationary and the wash apparatus is reciprocated back and forth across the vehicle. In a gantry-type wash system, different wash operations are performed with each pass of the apparatus along the length of the vehicle.

In any automated wash system, however, it is desirable to dry the vehicle after it has been washed and rinsed. The conventional systems for drying vehicles are air blowers. Such blowers have assumed numerous configurations with the most common blowers being fixed to direct air horizontally at the sides of the vehicle and vertically downwardly onto the top of the vehicle. As with the washing of the vehicle, the vehicles are movable relative to the blowers so the drying occurs as the vehicle is moved past the blowers.

Most blow dryers for automotive vehicles are inefficient and therefore unsatisfactory in that the air being blown onto the vehicle is counterproductive with air from one blower directed in an opposite direction to air from another blower and as a consequence the liquid particles on the vehicle are not desirably removed from the surface of the vehicle.

More recently, rotary blow drying nozzles have been mounted on fans above vehicles so that concentrated fan-shaped streams of air are blown onto the vehicle either in a direction perpendicular to the surface of the vehicle or in a reciprocating pattern. With these blow dryers, there is again no conscience attempt to move the liquid particles off the surface of the vehicle but rather the air is simply randomly blown at the vehicle resulting in inefficient drying of the vehicle.

In a rotary blow dryer of the type described above, there is typically a large fan having a housing with an inlet and an outlet. The rotary nozzle is rotatably mounted on the fan housing at the outlet and rotated about an axis with a drive actuator mounted externally of the nozzle and fan housing. In one such arrangement, the actuator is connected to the nozzle with a belt that extends around the nozzle such that operation of the actuator rotates the nozzle through the interconnection with the belt. Such arrangements are relatively expensive and aesthetically displeasing.

In another system for rotary movement of the nozzle, a rotary actuator is disposed on the axis of rotation of the nozzle which is more simple and inexpensive as well as being aesthetically more attractive. Such an arrangement is described in copending application U.S. Ser. No. 10/177,034 filed Jun. 20, 2002 which is of common ownership with the present application. In the aforenoted application, a method of using the rotary nozzles is also disclosed in both a two nozzle and three-nozzle embodiment. In the two-nozzle embodiment, the nozzles are oriented so as to move the water particles toward a common side of the vehicle and this is accomplished with the air movement from one blower forming a relatively large angle relative to the longitudinal centerline of the vehicle and the other a relatively small angle. When the direction of movement of the blowers along the length of the vehicle is reversed, the angles of the blower nozzles are also reversed so the water particles are moved toward the opposite side of the vehicle.

In the three-nozzle embodiment, the center nozzle is positioned above the longitudinal centerline of the vehicle while the side nozzles are positioned above the sides of the vehicle. The center blower directs a conical stream of air at a 0° angle relative to the longitudinal centerline of the vehicle while the side blowers direct conical streams at an angle toward the center of the vehicle so that the three blowers cooperate in moving the liquid particles on the vehicle toward one end of the vehicle and off the sides of the vehicle.

Studies are continuously being made to improve the efficiency in drying vehicles and the present application is an example of accomplishments that have been made as a result of these studies.

BRIEF SUMMARY OF THE INVENTION

The present invention concerns improved systems and blow dryers for use in methods for drying a vehicle that has been automatically washed in a conventional car wash system. Car wash systems, as mentioned previously, can be of the tunnel type wherein the vehicle is advanced through a series of washing and drying systems or can be of the gantry type wherein the washing and drying systems are mounted in a reciprocating gantry that moves back and forth along the length of the vehicle to sequentially wash and dry the vehicle. In either event, the vehicle is moved relative to blow dryers after the vehicle has been washed to remove remaining droplets of water.

In accordance with the present invention, a plurality of two or three blow dryers are mounted above a vehicle in a position for movement relative to the vehicle. As the vehicle is moved beneath the blow dryers or vice versa, water droplets on the vehicle are blown from the surface of the vehicle in an efficient predetermined pattern and sequence. The blowers themselves are conventional having a downwardly opening outlet in which is mounted a nozzle that redirects and concentrates the air moving therethrough in a predetermined direction. The nozzle can be fixed relative to the outlet of the blower housing or uniquely pivoted in accordance with the present invention about a horizontal axis as will be described in detail later.

There are four methods for drying a vehicle disclosed in the present application with one system utilizing two blowers having fixed nozzles, the second using two blowers with pivotal nozzles, the third with three blowers utilizing fixed nozzles, and the fourth utilizing three blowers with pivotal nozzles.

In all of the above methods, a pattern of air blown onto the vehicle is designed to move the water droplets efficiently off the vehicle so that the vehicle can be air dried in one or two passes of the blowers along the length of the vehicle.

The pivotal nozzle is uniquely designed so that it can pivot within the outlet of the blower in sealed relationship therewith whereby a mass of concentrated air can be directed through two or more selected angles. The pivoting of the nozzle is preferably effected with a linear actuator which could be pneumatic, hydraulic, electric or the like, and is movable between at least two positions. The actuator has a housing secured to the outlet of the blower housing and a linear actuated plunger connected to the nozzle. The nozzle is pivotally mounted on a transverse horizontal axis that is positioned relative to the vehicle in a predetermined orientation so that the pivotal movement of the nozzle relative to the blower housing desirably directs the concentrated mass of air emanating therefrom in a direction to complement corresponding masses of air being emitted from another or two other nozzles.

Other aspects, features, and details of the present invention can be more completely understood by reference to the following detailed description of the preferred embodiments, taken in conjunction with the drawings and from the appended claims.

BRIEF DESCRIPTION OF THE DRAWINGS

FIG. 11 is an elevation similar to FIG. 9 but with the nozzles on the blowers positioned as they would be when the gantry is moved from near the rear of the vehicle to the front of the vehicle.

FIG. 12 is a fragmentary diagrammatic plan view of the system illustrated in FIG. 11 showing the nozzles on the blowers oriented as they are when the gantry is moved from the rear of the vehicle toward the front of the vehicle and again with the area at which the blown air impinges the vehicle being shown stippled.

FIG. 21 is a fragmentary vertical section taken along line 21—21 of FIG. 17.

FIG. 22 is a fragmentary vertical section similar to FIG. 21 with the nozzle having been pivoted 25 degrees to the right.

DETAILED DESCRIPTION OF THE INVENTION

Figure 2:
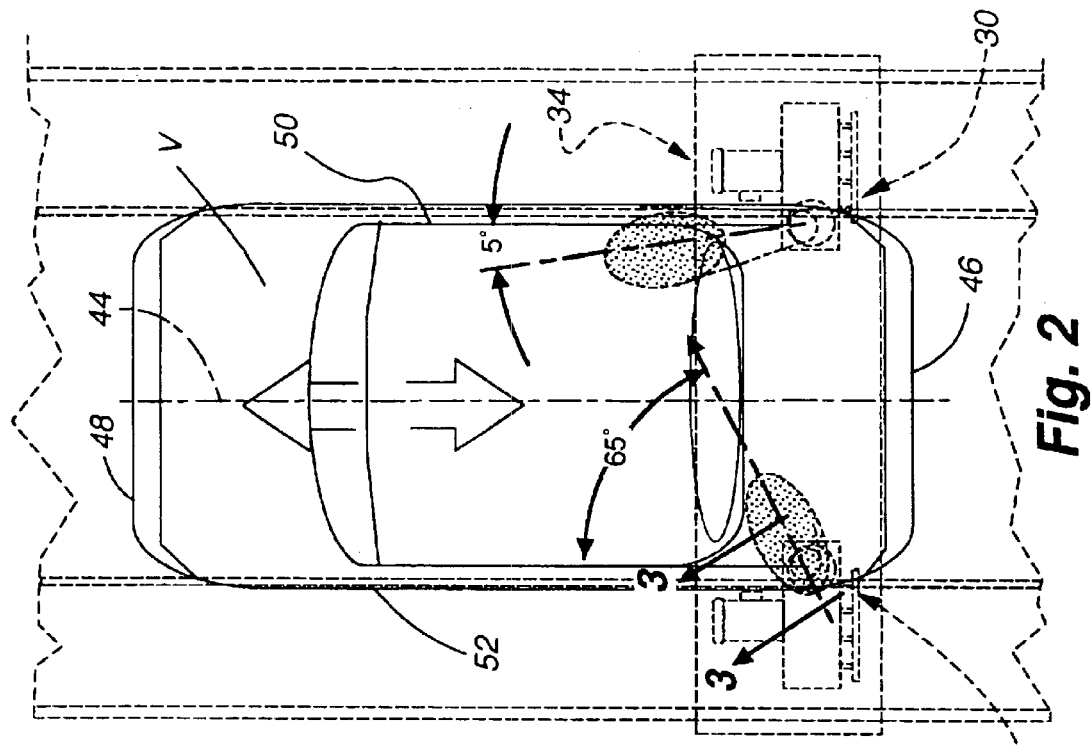
FIG. 2 is a fragmentary diagrammatic top plan view of the gantry and vehicle of FIG. 1 showing the blow drying apparatus near the front end of the vehicle and showing the pattern of the discharged air on the surface of the vehicle in a stippled representation and showing that the gantry moves rearwardly and forwardly with that pattern of discharged air.

The present invention will be described in connection with a gantry-type car wash system even though it will be appreciated the system would be equally adaptable to use in tunnel-type systems with the only importance being that the air blowers used to blow dry a vehicle in accordance with the invention are moved relative to the vehicle along its length. Further, the blowers 30 used in the present invention are conventional fan-type blowers having a fan blade (not seen) disposed in a housing with the housing having a cylindrical outlet 32 through which air is discharged from the blower. Nozzles are mounted in the outlet from the blower as is well known in the art, but the nozzles are disposed in a predetermined direction for most efficient drying of the vehicle and in some embodiments utilize a unique nozzle that is pivotally mounted on the outlet from the blower.

As will be described in more detail hereafter, there are four different arrangements of blow dryers (including blowers and attached nozzles) that have been found to provide efficient drying of a vehicle that has been previously washed as in an automated car wash system. One system utilizes a single pair of blowers having fixed nozzles disposed in their cylindrical outlets, a second utilizes three blowers having fixed nozzles positioned in their outlets, a third utilizes two blowers having pivotal nozzles mounted in their outlets and a fourth utilizes three blowers having pivotal nozzles mounted in their outlets. In the fourth arrangement, there are two different systems for orienting the nozzles that have been found to be effective in drying a vehicle and they will both be described hereafter. Further, while a description of the systems identified above will be described hereafter with the initial movement of the gantry being from the front of the vehicle to the rear, a vehicle can be dried equally well moving the gantry initially from the rear of the vehicle to the front.

Looking first at FIGS. 1–4, a first method is shown for drying a vehicle with the vehicle positioned beneath a gantry-type apparatus 34 wherein a pair of blowers 30 are mounted along the top of the gantry with the outlets 32 directed downwardly and in substantially vertical alignment with the sides of the vehicle. Nozzles 36 are fixed relative to the cylindrical outlets of the blowers but the angle of fixation is different for the nozzles associated with each blower. The fixed nozzles 36 are illustrated best in FIGS. 3 and 4 with each nozzle having a cylindrical upper component 38 secured in any suitable manner within the cylindrical outlet 32 of its associated blower 30 and with a severed conical lower component 40 fixed within the lower edge of the cylindrical upper component. The lower component 40 has been severed at an angle to horizontal in the range of 15° to 25°, preferably substantially 20°, so as to define an ovular opening 42 in the lower component that is directed substantially 20° off vertical. Accordingly, it will be appreciated, the nozzle can be oriented by rotating the cylindrical upper component 38 of the nozzle about a vertical axis so that the mass of air emanating from the nozzle can be directed in any selected predetermined circumferential direction even though the air would always be directed in the substantially 20° downward direction.

Figure 1:
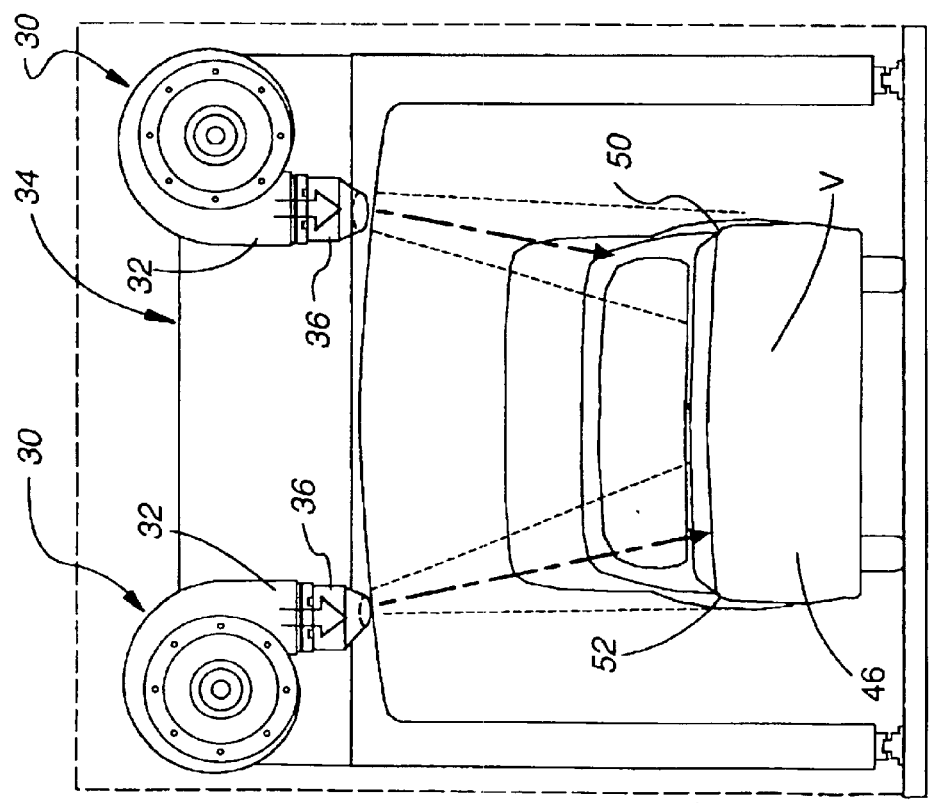
FIG. 1 is a diagrammatic elevation looking at the front of a vehicle positioned in a gantry-type car wash in accordance with the present invention with the gantry showing a pair of blow dryers having fixedly positioned nozzles.
Figure 3:
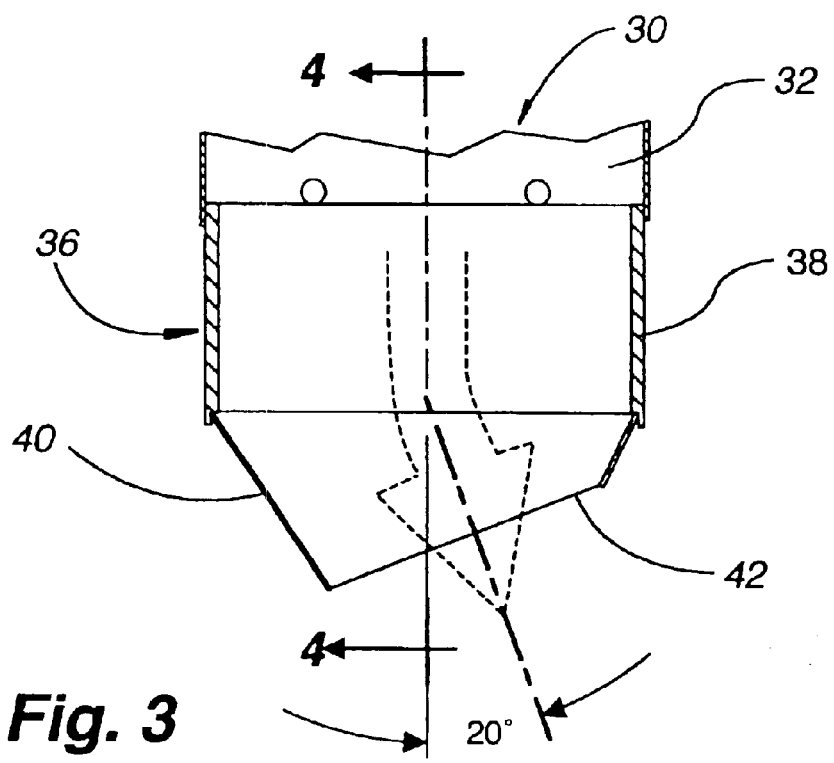
FIG. 3 is an enlarged fragmentary section taken along line 3—3 of FIG. 2 illustrating a fixed nozzle embodiment used in the invention.
Figure 4:
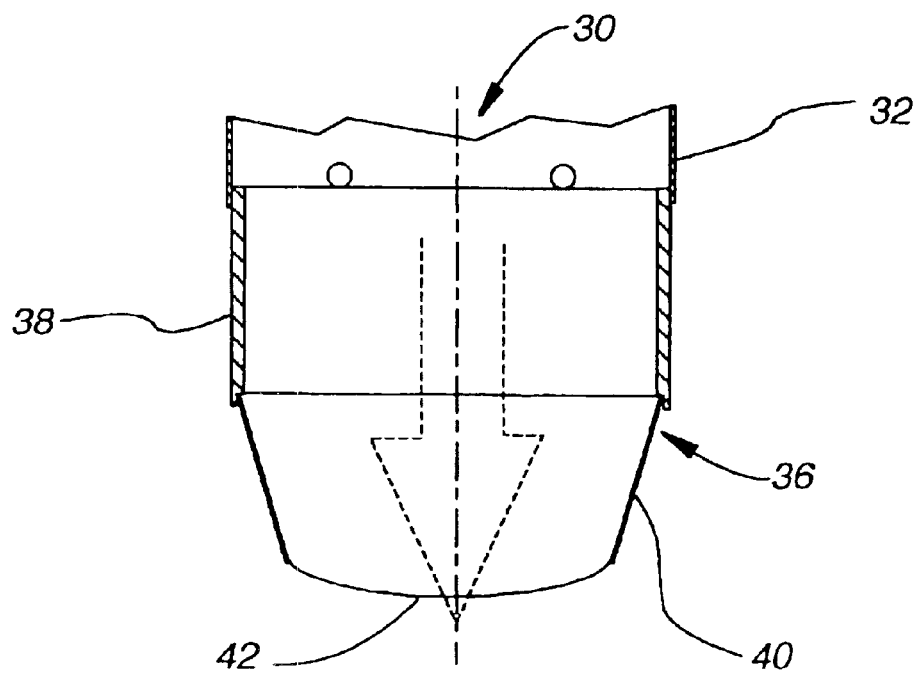
FIG. 4 is a fragmentary vertical section taken along line 4—4 of FIG. 3.

With specific reference to FIGS. 1 and 2, the gantry 34 is shown positioned near the front 46 of a vehicle (V) having a longitudinal centerline 44 even though in actuality the gantry would commence its rearward movement from a position in front of the front 46 of the vehicle and would continue forward until the gantry was slightly behind the rear 48 of the vehicle. It can then be reversed in a conventional manner for movement from the rear of the vehicle toward the front of the vehicle to complete a drying operation if desired.

The nozzle 36 on the blower 30 on the right side of the vehicle, as viewed in FIG. 2, is substantially vertically aligned with the right side 50 of the vehicle and has been oriented so that the mass of air emanating from the nozzle is directed downwardly at the substantially 20° angle relative to vertical as is dictated by the design of the nozzle, but in a rearward direction and at an angle in the range of 3° to 15°, preferably substantially 5° off a vertical plane extending parallel to the longitudinal centerline of the vehicle so that the air hits the surface of the vehicle in a substantially ovular pattern. The blow dryer on the left side of the vehicle is substantially aligned with the left side 52 of the vehicle and oriented so that the mass of air emanating from its nozzle is also directed forwardly and downwardly at a substantially 20° angle relative to vertical in accordance with the dictates of the nozzle design, but also rearwardly at an angle in the range of 50° to 70°, preferably substantially 65° relative to the longitudinal centerline of the vehicle so that it hits the surface of the vehicle also in an ovular pattern.

The nozzles 36 are fixed relative to the blowers 30. They direct air in the predetermined pattern shown in FIGS. 1 and 2 as the gantry 34 moves rearwardly relative to the vehicle and optionally forwardly. By blowing air in this manner, it has been found that the water droplets on the surface of the vehicle, subsequent to a wash operation, are moved in concert toward the rear and right side of the vehicle causing an efficient drying of the vehicle. It should also be noted that movement of the gantry in a single pass from the front to the rear of the vehicle will somewhat dry the vehicle and in some instances a single pass may be sufficient. Regulating the speed of the gantry has a direct bearing on the selection of one or two passes. Two passes of the gantry, one rearwardly and one forwardly, will however more fully dry the vehicle where necessary or desired.

Figure 8:
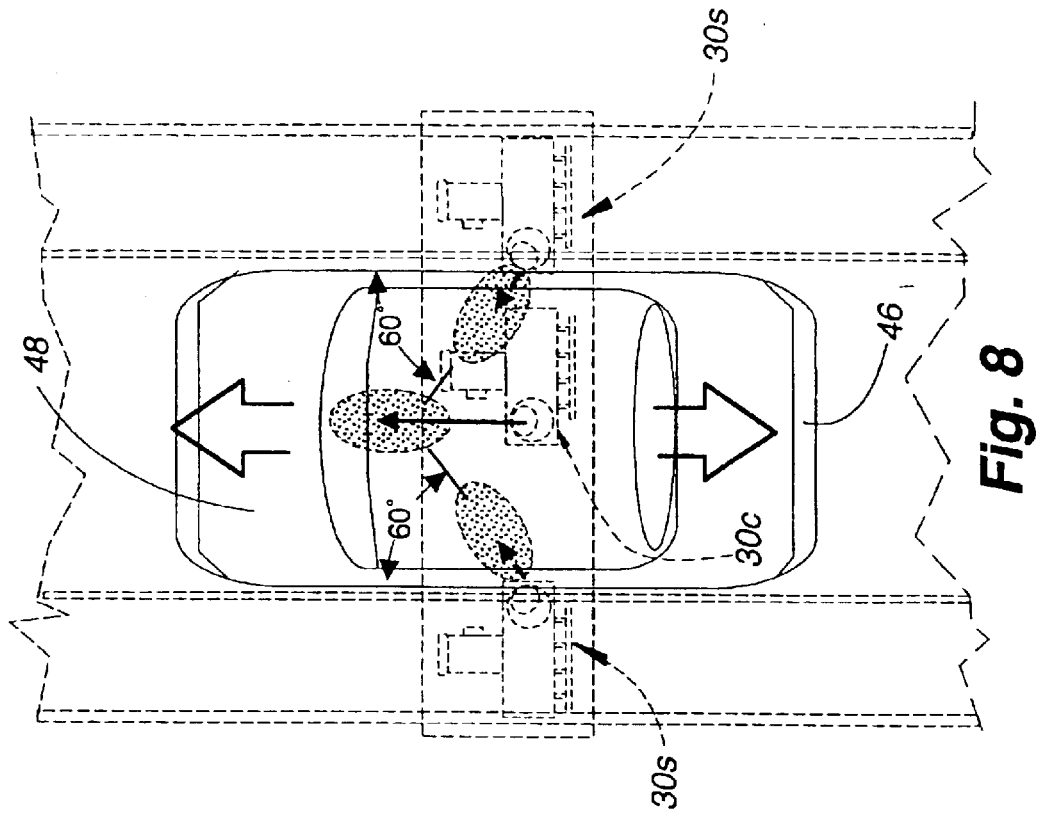
FIG. 8 is a fragmentary diagrammatic plan view of the system illustrated in FIG. 7 with the gantry positioned approximately midway along the length of the vehicle and with arrow representations illustrating the rearward and forward movement of the gantry relative to the vehicle.
Figure 7:
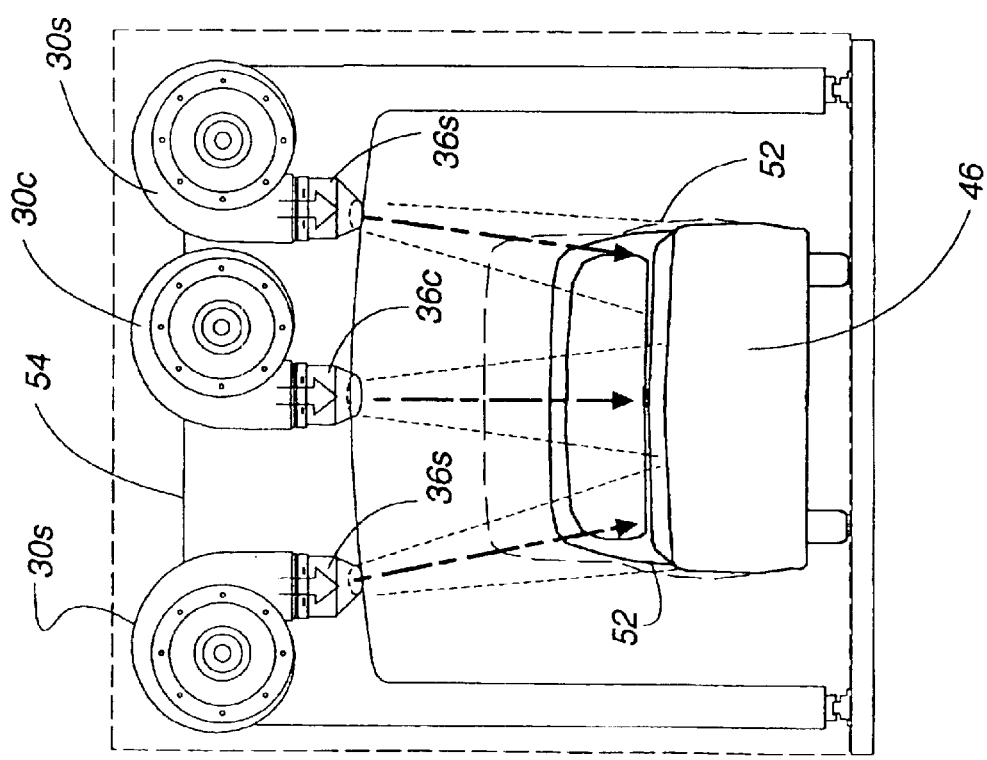
FIG. 7 is a diagrammatic elevational view looking at the front of a vehicle in a gantry-type car wash showing three blow dryers with fixed nozzles.

Referencing FIGS. 7 and 8, a second method of drying a vehicle is illustrated. There are three blow dryers mounted on a gantry 54 overlying a vehicle positioned beneath the gantry with a pair of side blowers 30s having their discharge outlets in substantial vertical alignment with the sides 50 and 52 of the vehicle and a center blower 30c having its discharge outlet substantially aligned with the longitudinal centerline of the vehicle. The gantry of course is disposed for reciprocating movement along the length of the vehicle so that the drying operation can be performed in a single pass of the gantry from front to rear or vice versa, or in a double pass from front to rear and from rear to front of the vehicle. As mentioned previously, the direction of the first and second passes is not important.

As is probably best seen in FIG. 8, side nozzles 36s are disposed in a complementary manner so that the right side nozzle directs air downwardly at an angle in the range of 15° to 25°, preferably substantially 20° relative to vertical, and is angled inwardly toward the rear 48 of the vehicle at an angle in the range of 55° to 65°, preferably substantially 60° relative to the longitudinal centerline of the vehicle. The left side blower is similarly disposed but with the air being blown to the right rather than the left. It will be appreciated the air impinging the top surface of the vehicle is therefore in generally ovular patterns angularly directed toward the rear 48 of the vehicle. The center blower has its nozzle 36c again directed downwardly at an angle in the range of 15° to 25°, preferably substantially 20° relative to vertical but with the nozzle being aligned with the longitudinal centerline of the vehicle and directed toward the rear of the vehicle so the air again impinges the surface of the vehicle in a substantially ovular pattern. It will therefore be appreciated from FIG. 8 that a virtual cushion of air covers substantially the entire width of the vehicle which cushion comprises the ovular distribution of air on the surface of the vehicle from all three blowers. As mentioned previously, the gantry can move simply from the front 46 to the rear 48 of the vehicle or vice versa or can move along the length of the vehicle in reciprocating passes for more complete drying.

Figure 5:
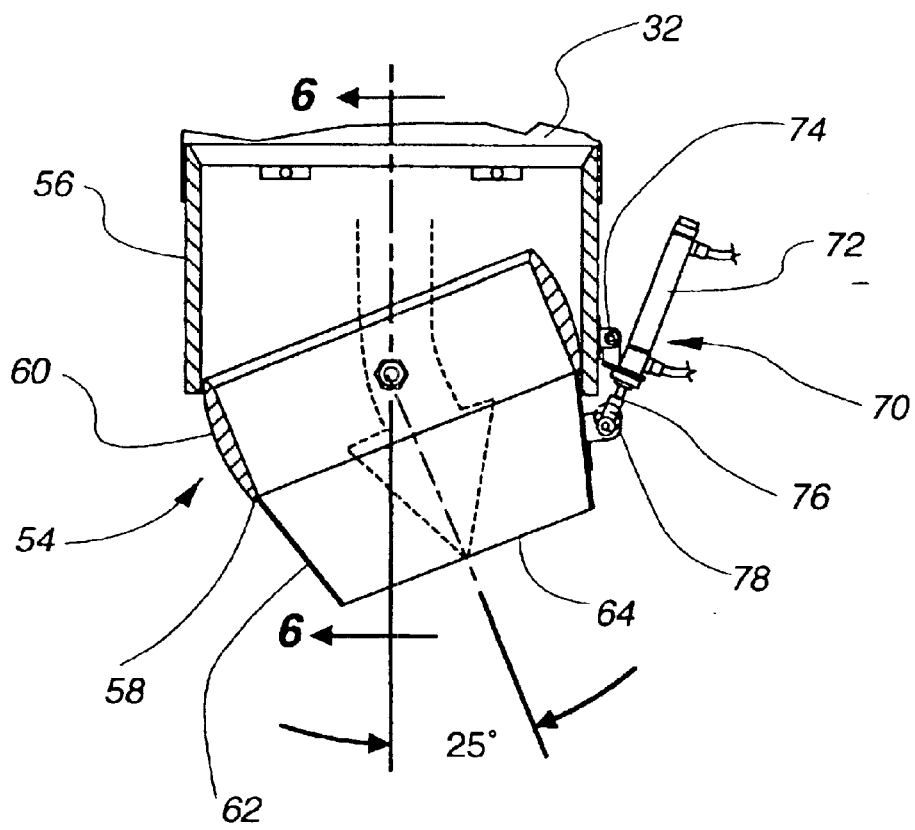
FIG. 5 is a fragmentary vertical section similar to FIG. 3 showing a pivotal nozzle embodiment used in the present invention.
Figure 6:
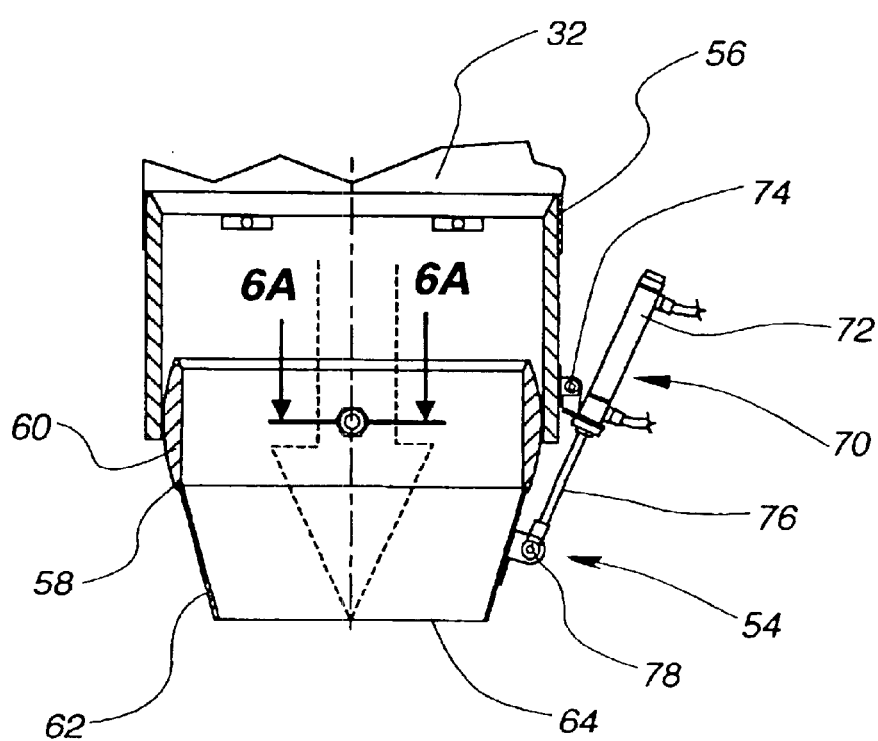
FIG. 6 is a fragmentary section taken along line 6—6 of FIG. 5.
Figure 6A:
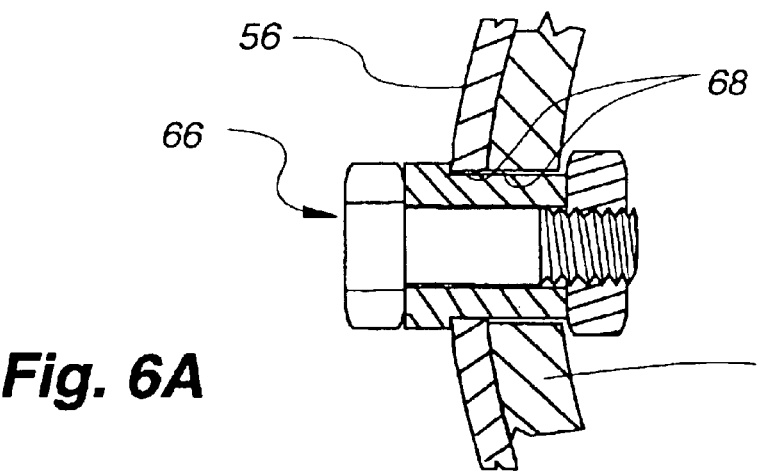
FIG. 6A is a further enlarged section taken along line 6A—6A of FIG. 6.
Figure 6B:
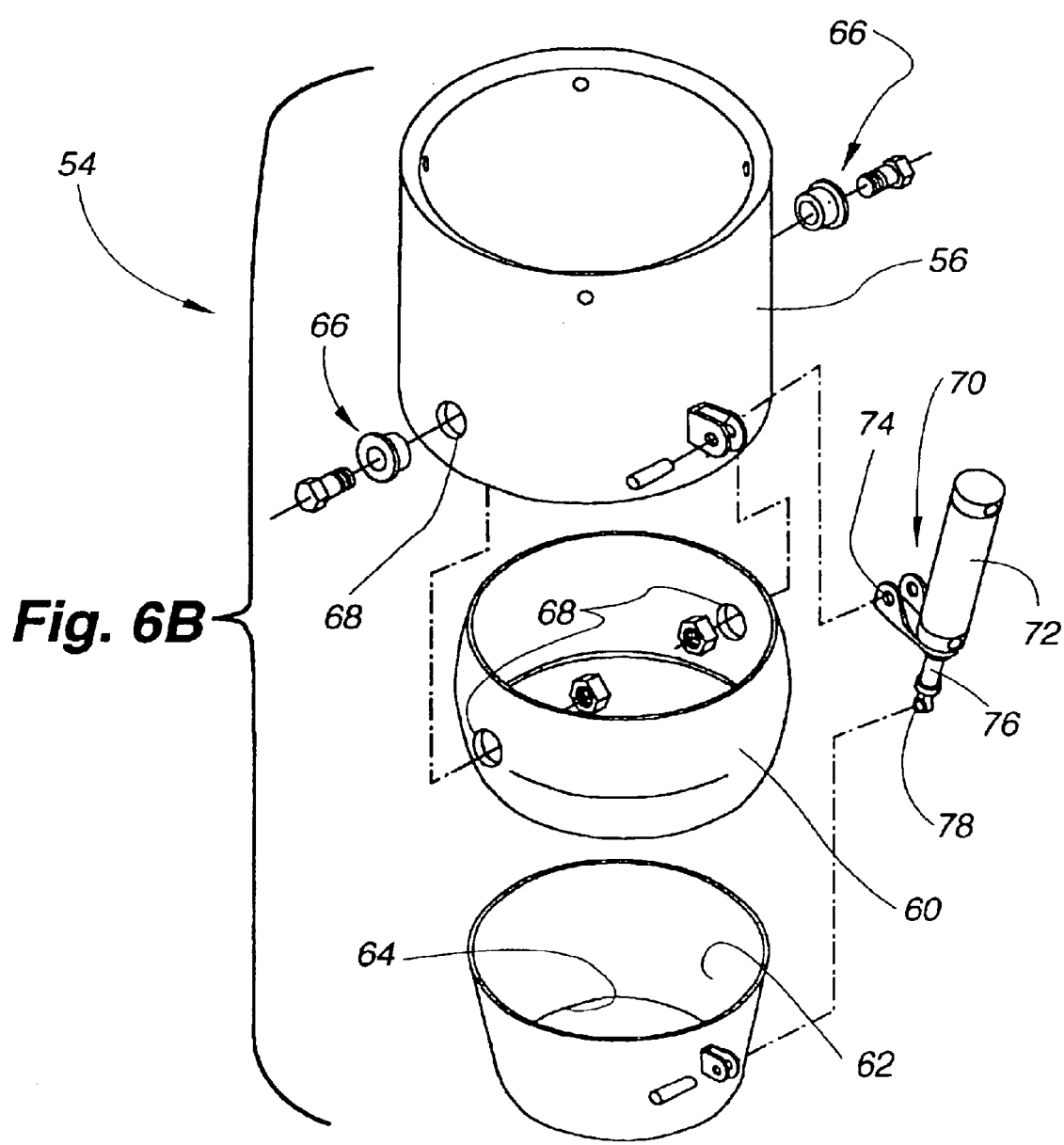
FIG. 6B is an exploded isometric of the pivotal nozzle of FIGS. 5 and 6.

Use of pivotal nozzles 54 designed as shown in FIGS. 5 and 6 are illustrated in FIGS. 9–16 in connection with third and fourth methods of drying a vehicle. With reference to FIGS. 5 and 6, the pivotal nozzles can be seen to have an upper cylindrical component 56 secured in the cylindrical outlet 32 of its associated blower 30 and a pivotal lower component 58 disposed within the circular opening in the bottom of the nozzle upper component 56. The lower nozzle component has an upper segment 60 having an external surface configured like a center band of a sphere, i.e., a spherical surface where the top and bottom portions have been removed. The diameter of the upper segment 60 corresponds to the internal diameter of the cylindrical upper component 56 of the nozzle so as to remain in slidable engagement therewith at all times. A lower segment 62 of the lower component 58 of the nozzle is frustoconical having a circular discharge opening 64 defined by a transverse cut through a conical wall perpendicular to the axis of generation. The lower frustoconical segment 62 of the pivotal nozzle is integral or positively secured to the upper segment. The pivotal lower component 58 of the nozzle is mounted within the upper component on a pair of diametrically opposed transverse horizontal pivot shafts 66 which are secured to the upper nozzle body in any suitable manner. Diametrically opposed openings 68 are provided in the upper and lower components 56 and 58, respectively, of the nozzle to receive the pivot shafts so that the lower component 58 of the nozzle can pivot within an angle in the range of 20° to 30°, preferably substantially 25°, about a horizontal axis.

Figure 20:
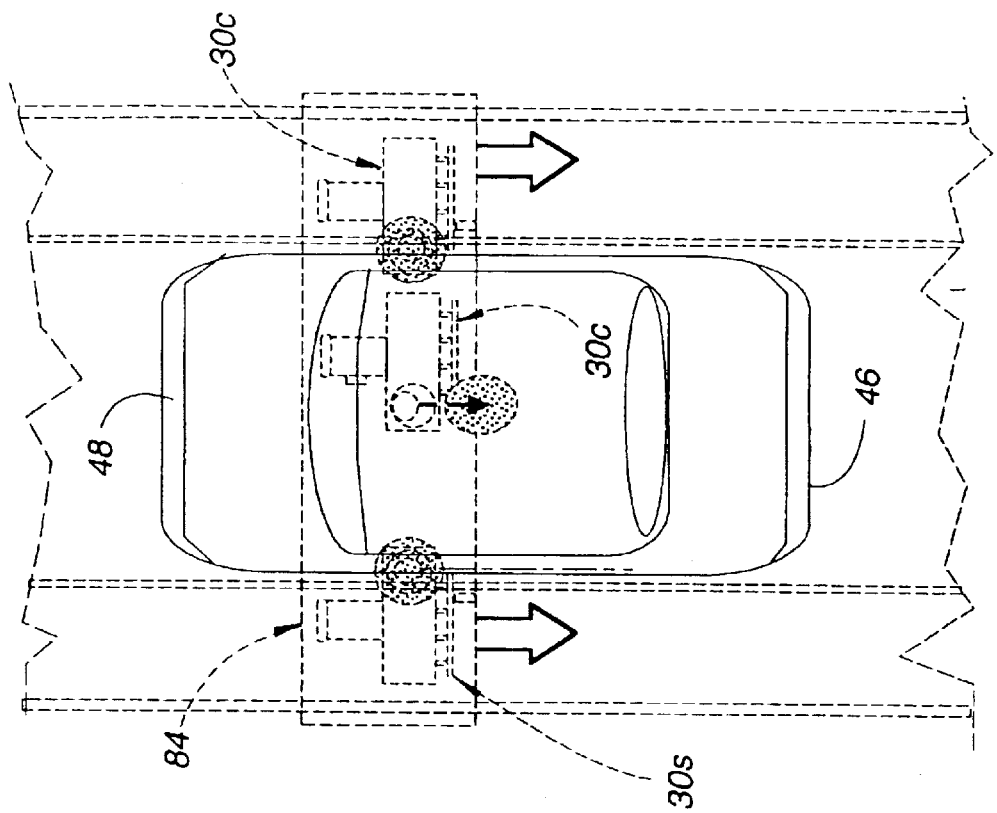
FIG. 20 is a fragmentary diagrammatic plan view similar to FIG. 18 with the nozzles positioned as they are in a forward movement of the gantry.
Figure 19:
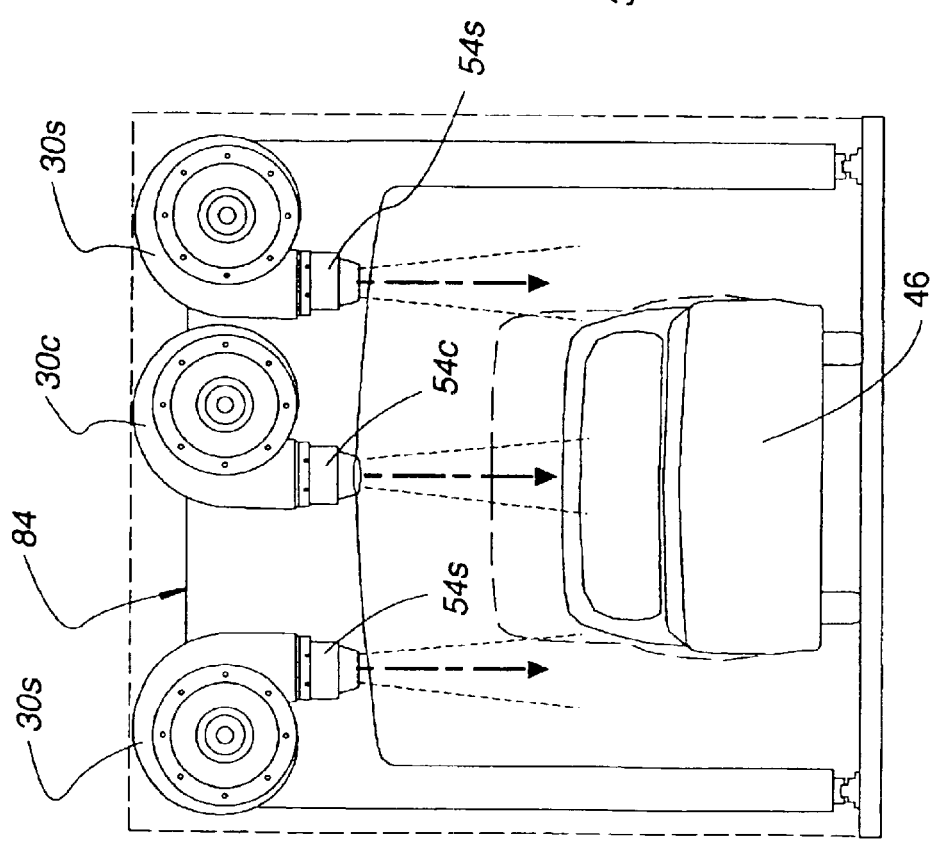
FIG. 19 is a diagrammatic elevation similar to FIG. 17 with the pivotal nozzles oriented as they are when the gantry moves from the rear of the vehicle to the front.

The lower component 58 of the nozzle 54 is moved relative to the upper component 56 with a linear actuator 70 which could be in the form of pneumatic or hydraulic actuators or an electric solenoid but in any instance having a housing or body portion 72 pivotally connected at 74 to the outer surface of the upper component 56 of the nozzle and a plunger portion 76 pivotally connected at 78 to the lower frustoconical segment 62 of the nozzle. It will be appreciated that extension (FIG. 6) of the linear actuator aligns the outlet from the nozzle with the central axis of the outlet 32 from the blower whereas retraction (FIG. 5) of the linear actuator pivots the nozzle through an angle in the range of 20° to 30°, preferably substantially 250. This angle is predetermined and could be any desirable angle even though angles within 20° to 30° have been deemed most suitable for purposes of the present invention. It will also be appreciated, as will be described in more detail later, that the location of connection of the linear actuator to the nozzle can determine the locations of the pivotal movement of the nozzle so it can pivot from vertical to one side as illustrated in FIGS. 5 and 6 or to one side or the other of a longitudinal centerline of the nozzle as shown in FIGS. 19 and 20. Further, while the linear actuator illustrated is movable between two defined positions, it could be variably movable between an infinite number of positions to vary the angular possibilities of the nozzle.

Referring next to FIGS. 9–12, a gantry-type drying system 80 is illustrated in accordance with a third drying method having a pair of blow dryers 30 with their outlets 32 substantially vertically aligned above the sides 50 and 52 of a vehicle (V) and with pivotal nozzles 54 of the type illustrated in FIGS. 5 and 6 mounted on the outlets of the blowers. The nozzles are designed to be positioned differently when the gantry moves from the front to the rear of the vehicle than when the gantry moves from the rear to the front of the vehicle.

Figure 10:
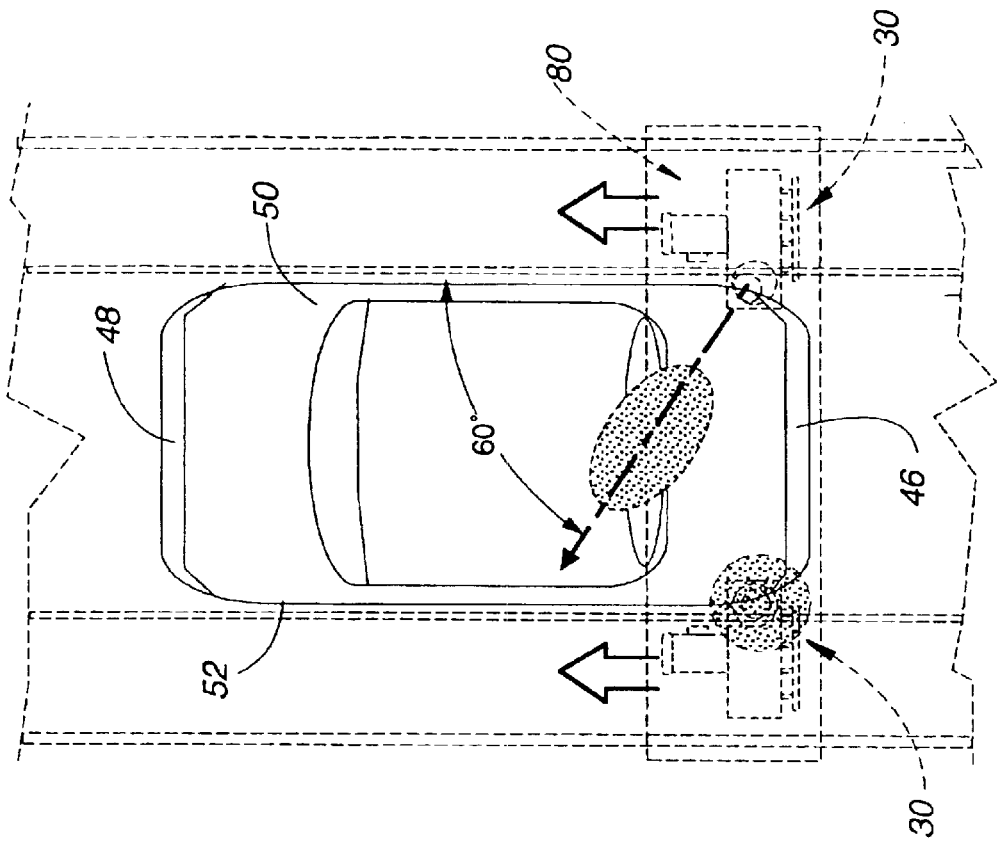
FIG. 10 is a fragmentary diagrammatic top plan view of the system illustrated in FIG. 9 showing the pivotal nozzles in their position when the gantry is moved from the front of the vehicle to the rear of the vehicle and with the pattern of the air as it impinges upon the surface of the vehicle shown stippled.
Figure 9:
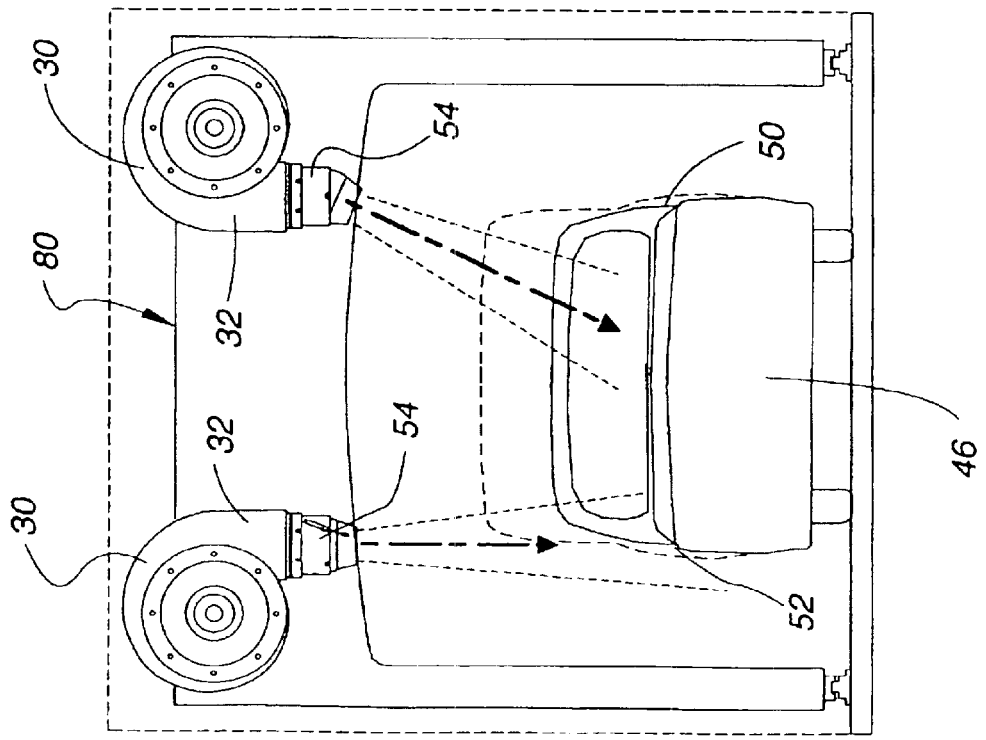
FIG. 9 is a diagrammatic elevation showing a vehicle in a gantry-type vehicle wash system having two blow dryers utilizing pivotal nozzles in accordance with the present invention.

With reference to FIGS. 9 and 10, the pivotal nozzles on the pair of blowers are oriented for when the gantry 80 is moved from the front 46 to the rear 48 of the vehicle. The right nozzle can be seen to be angled downwardly at an angle in the range of 20° to 30°, preferably substantially 25° relative to vertical with the actuator in its fully retracted position of FIG. 5. The nozzle is also oriented rearwardly at an angle in the range of 55° to 65°, preferably 60° relative to the longitudinal centerline of the vehicle so as to define an ovular impingement pattern of the discharged air on the surface of the vehicle. The left hand blower as viewed in FIG. 10 is oriented as in FIG. 6 with the actuator fully extended and with the discharge opening from the nozzle being directed substantially vertically downwardly. With the nozzles in this orientation and the gantry moved from the front of the vehicle to the rear of the vehicle, the discharged air moves water droplets from the surface of the vehicle toward the left side of the vehicle and down the left side for complete removal from the vehicle.

Before the gantry moves from the rear 48 of the vehicle to the front 46 of the vehicle as shown in FIGS. 11 and 12, the nozzles 54 on the blowers 30 are reversed so the nozzle on the right hand blower is directed vertically downwardly with full extension of the linear actuator 70 as seen in FIG. 6 and with the left hand blower angled through a complete retraction of the cylinder so that the air is discharged in a forward direction that is at an angle in the range of 20° to 30°, preferably substantially 25° downwardly relative to vertical and at an angle in the range of 55° to 65°, preferably substantially 60° relative to the longitudinal centerline of the vehicle. When the gantry moves forwardly with the nozzles so oriented, any remaining water droplets on the surface are moved toward the right side and front of the vehicle and are discharged downwardly off the right side for complete removal from the vehicle.

Figure 14:
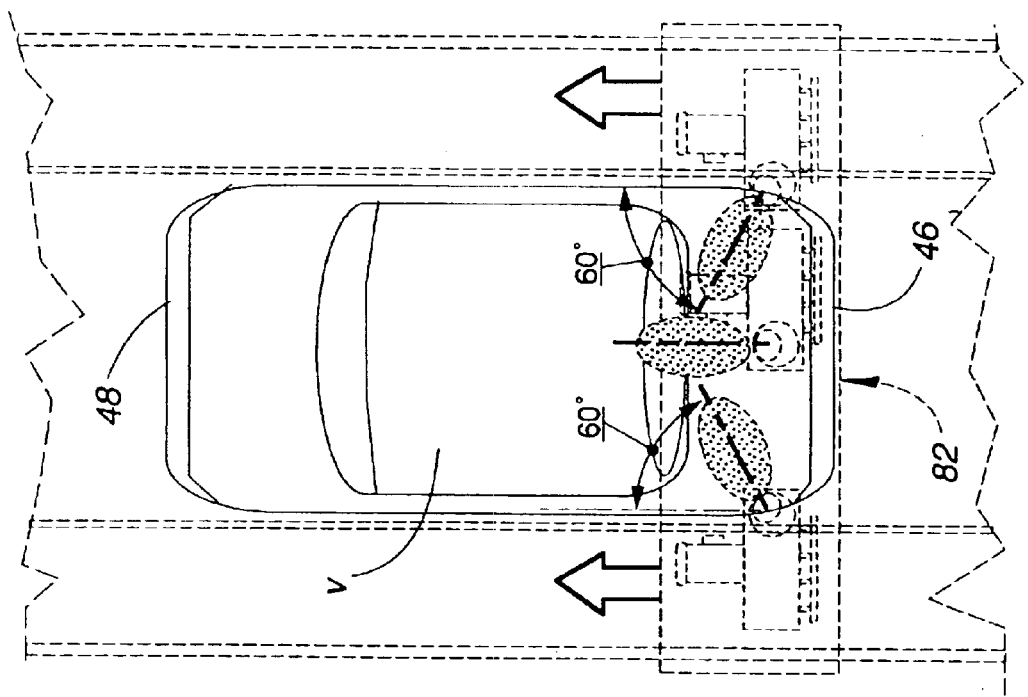
FIG. 14 is a fragmentary diagrammatic top plan view showing the system as illustrated in FIG. 13 and again illustrating the pattern of the impinging blown air stippled.
Figure 13:
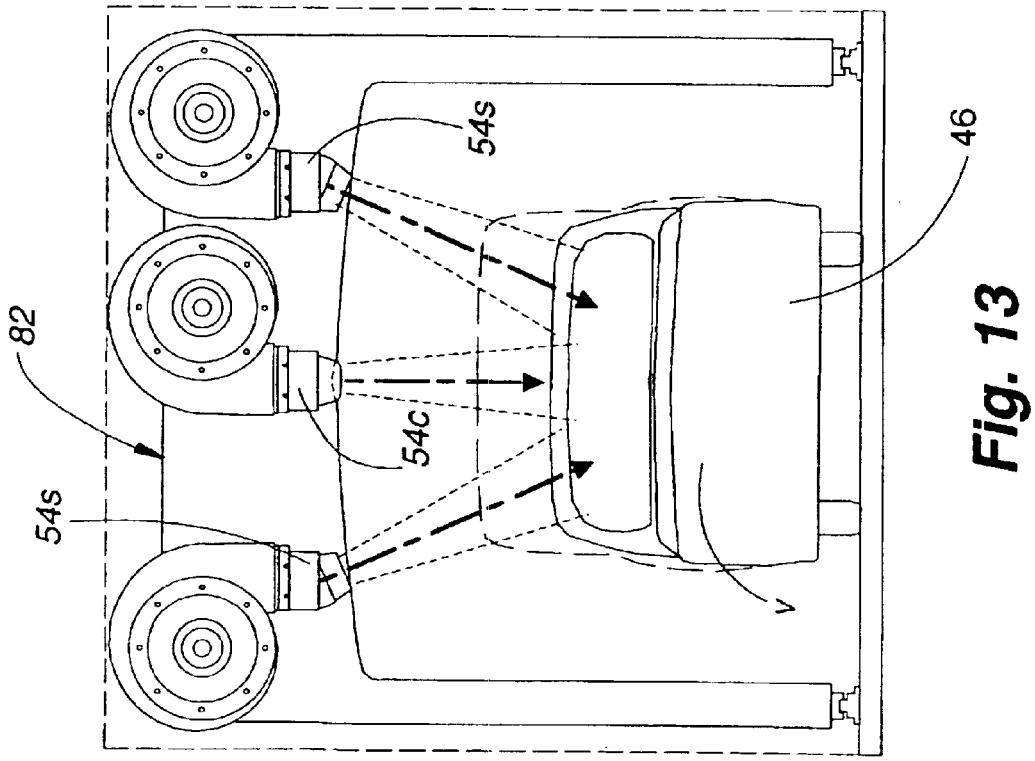
FIG. 13 is a diagrammatic elevation looking at the front of a vehicle in a gantry-type wash utilizing three blowers having pivotal nozzles and with the nozzles oriented as they would be when the apparatus is moved from the front of the vehicle to the rear of the vehicle.
Figure 16:
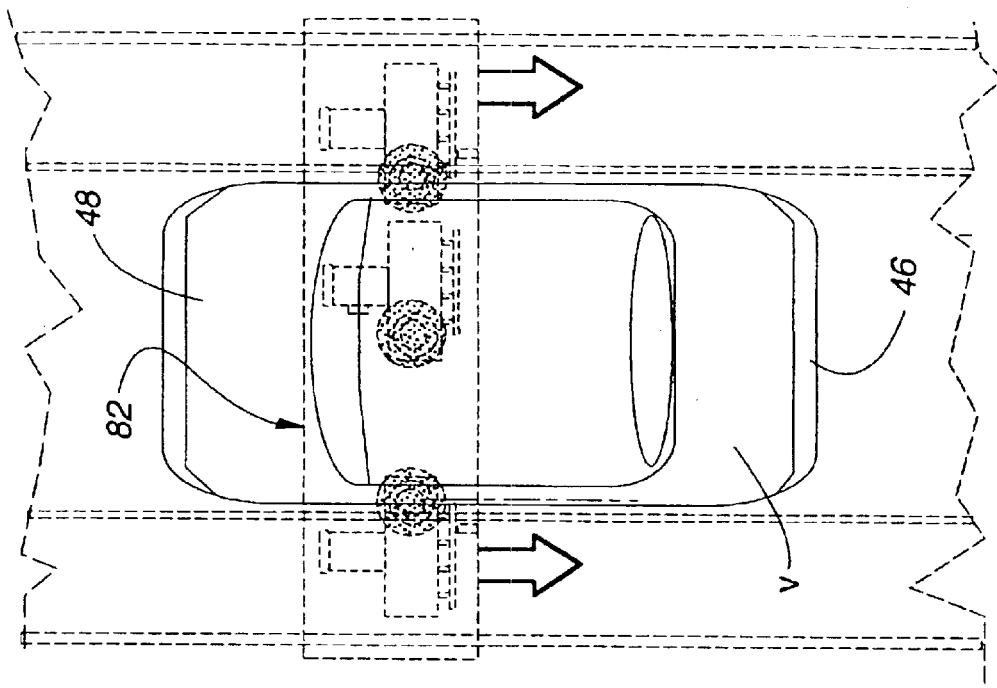
FIG. 16 is a fragmentary diagrammatic view of the system shown in FIG. 15 and again illustrating the pattern of the impinging air on the surface of the vehicle stippled.
Figure 15:
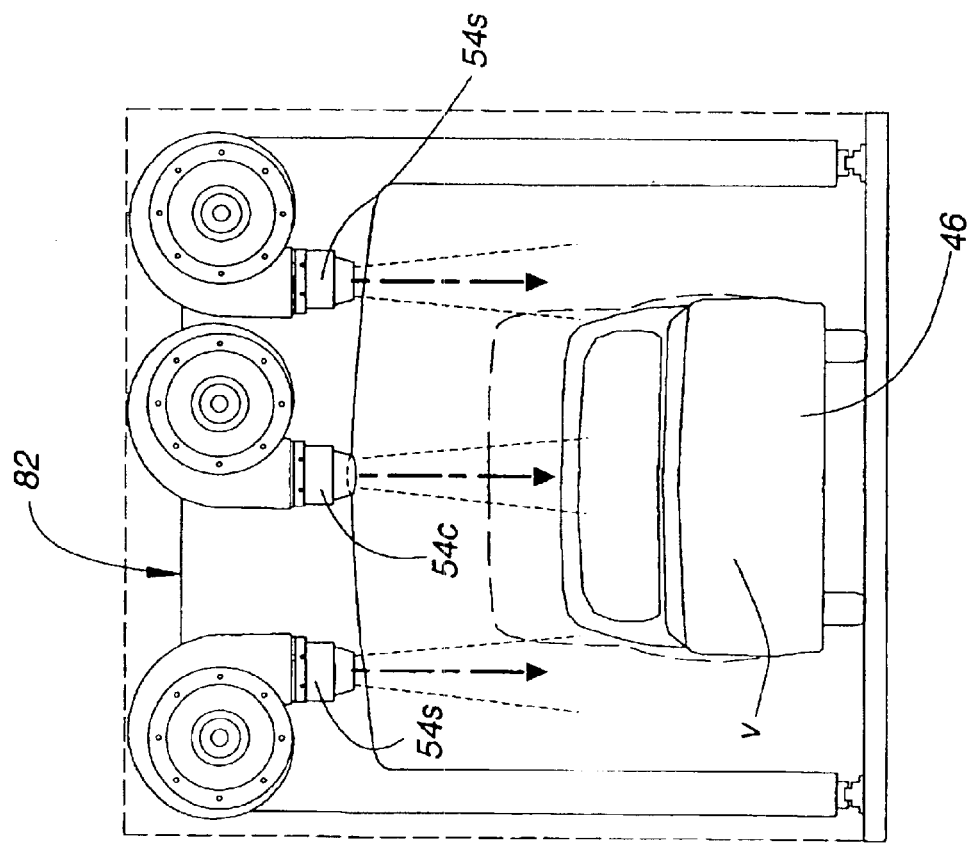
FIG. 15 is an elevation looking at the front of a vehicle in a gantry-type wash system similar to FIG. 13 except the nozzles are oriented as they would be when the gantry is moved from the rear of the vehicle to the front of the vehicle.

With reference to FIGS. 13–16 in a fourth method for drying a vehicle, three blow dryers are oriented over the vehicle in a gantry-type wash system 82 as in FIGS. 7 and 8 but the blow dryers have pivotal nozzles 54 of the type illustrated in FIGS. 5 and 6. The nozzles are again oriented in one position as shown in FIG. 14 when the gantry 82 is moved from the front 46 of the vehicle (V) to the rear 48 of the vehicle and in a different position when the gantry is moved from the rear of the vehicle to the front of the vehicle. With reference to FIGS. 13 and 14, it will be appreciated all three nozzles are positioned as in FIG. 5 with the actuator 70 fully retracted so the discharged air is discharged at an angle in the range of 20° to 30°, preferably substantially 25° relative to vertical and with the right and left nozzles 54s being directed toward the longitudinal centerline at an angle in the range of 55° to 65°, preferably substantially 60° and in a rearward direction. The center nozzle 54c is aligned with the longitudinal centerline and in a rearward direction directing air downwardly at an angle in the range of 10° to 20°, preferably substantially 12° so as the gantry moves from the front to the rear of the vehicle, the water droplets on the vehicle are moved by a large cushion of air forwardly and off the sides of the vehicle. When the gantry reaches the rear of the vehicle, the nozzles are reoriented as shown in FIGS. 15 and 16 so that all three nozzles are directed substantially vertically downwardly by full extension of the actuators as shown in FIG. 6. As the gantry then moves along the length of the vehicle from rear to front, air is blown downwardly and off the sides of the vehicle for a final complete drying of the vehicle.

FIGS. 17–20 illustrate still another method of using nozzles on three blowers 30 with the three blowers being again disposed as in FIGS. 13–16 but with the pivotal nozzles oriented differently.

Figure 18:
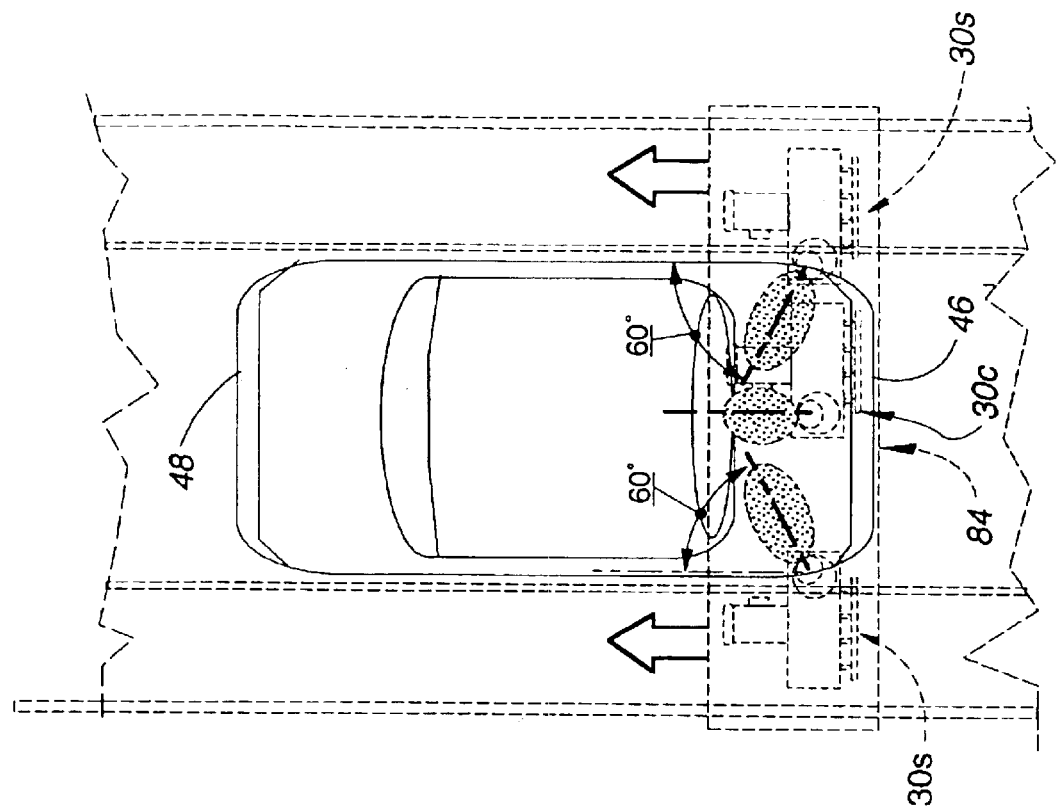
FIG. 18 is a fragmentary diagrammatic plan view similar to FIG. 17 showing the position of the nozzles during the rearward movement of the gantry relative to the vehicle.
Figure 17:
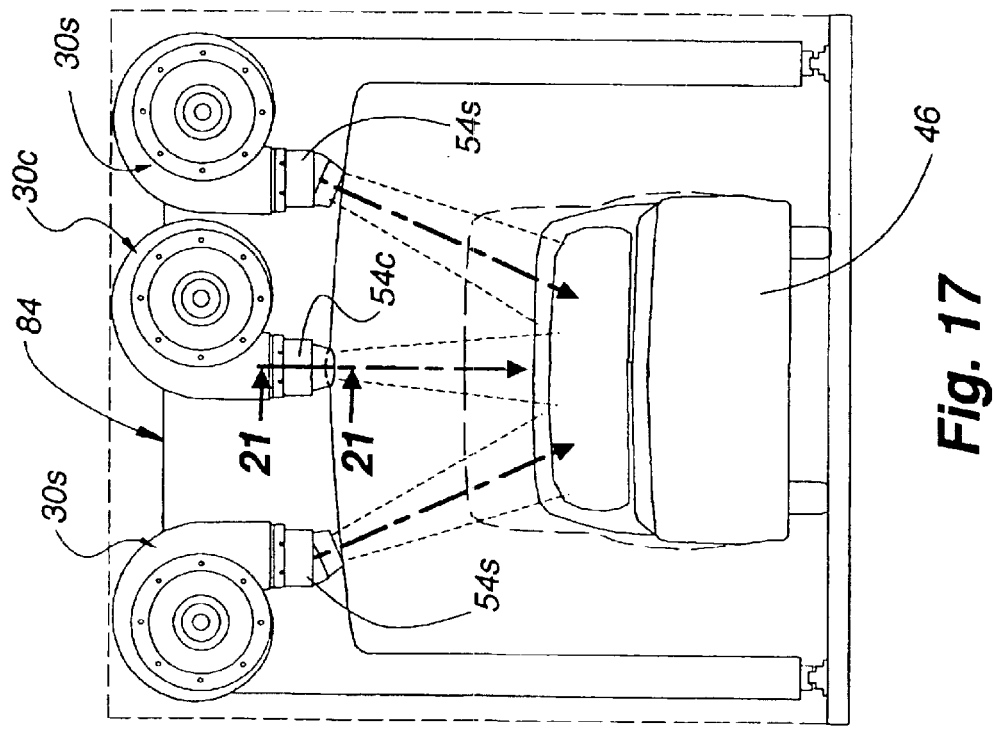
FIG. 17 is an elevation looking at the front of a vehicle in a gantry-type car wash again utilizing three blow dryers having pivotal nozzles but with the pivotal nozzles oriented differently than FIG. 15 for a different method of blow drying the vehicle.

As mentioned previously, by mounting the linear actuator 70 at different locations on either the upper nozzle component 56 or the lower nozzle component 58, the location of the angle through which the nozzle 54 pivots can be changed. It will be appreciated in FIGS. 21 and 22 that the actuator body 72 is pivotally mounted to the upper nozzle component at a lower location in FIGS. 21 and 22 than in FIGS. 5 and 6 so the nozzle pivots between an angle of substantially 12.5° to the right of vertical to an angle of substantially 12.5° to the left of vertical when the actuator is moved from the fully retracted position of FIG. 20 to the fully extended position of FIG. 21, respectively. Using the nozzle arrangement of FIGS. 21 and 22 on the center blower 30c of the apparatus illustrated in FIGS. 17–20, while using the pivotal nozzle arrangement of FIGS. 5 and 6 on the side blowers 30s, a further efficient method for blow drying a vehicle is achievable. With reference to FIGS. 17 and 18, when a gantry 84 is positioned to move rearwardly from the front 46 of the vehicle (V) to the rear 48 of the vehicle, the side blowers 30s both have their nozzles 54s oriented at an angle in the range of 55° to 65° relative to the longitudinal centerline, preferably 60°, and downwardly at an angle in the range of 20° to 30°, preferably substantially 25° with the actuator fully retracted. The center nozzle 54c is angled rearwardly along the longitudinal centerline of the vehicle and downwardly at an angle in the range of 7.5° to 17.5°, preferably substantially 12.5° relative to vertical. When the gantry reaches the rear end of the vehicle and begins a forward pass, as shown in FIG. 20, the side nozzles 54s are oriented substantially vertically downwardly with the actuators 70 fully extended and the center nozzle 54c oriented in a forward direction and along the longitudinal centerline of the vehicle at a downward angle in the range of 7.5° to 17.5°, preferably substantially 12.5° relative to vertical. In this manner, it has been found the air is moved forwardly by the center blower as the gantry is moved forwardly while the side blowers blow any excess water off the sides of the vehicle.

As will be appreciated from the above, there are various arrangements of both fixed and pivotal nozzles as well as uses of two or three blow dryers that can be used to efficiently blow dry a vehicle. Each of the aforenoted systems has been found to provide improvements over prior art drying systems where air is simply arbitrarily blown at the surface of the vehicle.

Although the present invention has been described with a certain degree of particularity, it is understood that the present disclosure has been made by way of example, and changes in detail or structure may be made without departing from the spirit of the invention as defined in the appended claims.

What is claimed is:

1. A method of drying the exterior surface of a vehicle comprising the steps of:
    providing a vehicle to be dried, said vehicle being elongated with a front end, a rear end, a top surface and side surfaces extending adjacent to said top surface from said front end to said rear end,
    providing a pair of blowers with nozzles mounted above said vehicle in a position to blow air downwardly in a predetermined direction onto the top and sides of said vehicle, said blowers being positioned on opposite sides of a longitudinal centerline of said vehicle extending from the front end to the rear end of said vehicle, said blowers being mounted for relative linear movement along the length of said vehicle, each nozzle being mounted in substantially vertical alignment with an associated side of said vehicle to direct a concentrated mass of air downwardly onto said vehicle as said blowers are moved relative to said vehicle along the length thereof and at a selected angle to said longitudinal centerline,
    positioning one of said blowers such that said predetermined direction of blown air is downward at an angle in the range of 15° to 25° relative to a horizontal plane and at an angle in the range of 3° to 15° relative to a vertical plane parallel to said longitudinal centerline,
    positioning the other of said blowers such that said predetermined direction of blown air is downward at an angle in the range of 15° to 25° relative to vertical and at an angle in the range of 50° to 70° relative to a vertical plane parallel to said longitudinal centerline, and
    moving said blowers in at least one longitudinal direction along the length of said vehicle while blowing air onto said vehicle.

2. The method of claim 1 wherein said nozzle on said one blower is disposed for directing air at an angle of substantially 5° relative to a vertical plane extending parallel to said longitudinal centerline and said other blower is disposed for directing air at an angle of substantially 65° relative to a vertical plane parallel with said longitudinal centerline.

3. The method of claim 2 wherein said blowers are moved in a reciprocal path along the length of said vehicle.

4. A method of drying the exterior surface of a vehicle comprising the steps of:
    providing a vehicle to be dried, said vehicle being elongated with a front end, a rear end, a top surface, and side surfaces extending adjacent to said top surface from said front end to said rear end,
    providing a pair of blowers with nozzles mounted above said vehicle in a position to blow air in a predetermined direction onto the top and sides of said vehicle, said blowers being positioned on opposite sides of a longitudinal centerline of said vehicle extending from the front end to the rear end of said vehicle, said blowers being mounted for linear movement along the length of said vehicle, each nozzle being mounted in substantially vertical alignment with an associated side of said vehicle to direct a concentrated mass of air downwardly onto said vehicle as said blowers are moved relative to said vehicle along the length thereof and at a selected angle to said longitudinal centerline, said nozzles being pivotally mounted on their associated blowers for pivotal movement in a vertical plane forming an angle in the range of 55° to 65° relative to said longitudinal centerline and being pivotally movable between a position wherein it directs air substantially vertically downwardly and a position wherein it directs air downwardly at an angle of substantially 25° relative to vertical,
    moving said blowers in a first longitudinal direction along the length of said vehicle while having one nozzle positioned to direct air substantially vertically downwardly and the other nozzle positioned to direct air downwardly in the direction of movement of said blowers at an angle of substantially 25° relative to vertical and at an angle in the range of 55° to 65° relative to said longitudinal centerline, and
    moving said blowers in an opposite longitudinal direction along the length of said vehicle having said one nozzle positioned to direct air downwardly in the direction or movement of said blowers at an angle of substantially 25° relative to vertical and at an angle in the range of 55° to 65° relative to said longitudinal centerline and said other nozzle being positioned to direct air substantial vertically downwardly.

5. The method of claim 4 wherein said vertical plane forms an angle of substantially 60° with the longitudinal centerline and the angle of said nozzles when directing air in the direction of movement of the blowers is substantially 60° relative to said longitudinal centerline.

6. A method of drying the exterior surface of a vehicle comprising the steps of:
    providing a vehicle to be dried, said vehicle being elongated with a front end, a rear end, a top surface and side surfaces extending adjacent to said top surface from said front end to said rear end, providing three blowers with nozzles mounted above said vehicle in a position to blow air in a predetermined direction onto the top and sides of said vehicle, two of said blowers being side blowers and being positioned on opposite sides of a longitudinal centerline of said vehicle extending from the front end to the rear end of said vehicle, the third blower being a center blower and being positioned along said centerline of the vehicle, said blowers being mounted for linear movement along the length of said vehicle, said side blowers being mounted in substantially vertical alignment with an associated side of said vehicle to direct masses of air downwardly onto said vehicle as said blowers are moved relative to said vehicle along the length thereof and at a selected angle to said longitudinal centerline, said center blower having its nozzle fixed to direct air downwardly in one direction substantially along said centerline and at an angle in the range of 15° to 25° relative to vertical, said side blowers having their nozzles disposed to direct air substantially in said one direction but at an angle in the range of 55° to 65° relative to said centerline and at a downward angle in the range of 15° to 25° relative to vertical, and moving said blowers along the length of said vehicle in at least a first direction.

7. The method of claim 6 wherein said center blower directs air along said centerline and downwardly in said one direction at substantially a 20° angle relative to vertical and said side blowers direct air substantially in said one direction but at an angle of substantially 60° relative to said centerline and at a downward angle of substantially 20° relative to vertical.

8. The method of claim 7 wherein sold blowers are moved reciprocally along said centerline.

9. A method of drying the exterior surface of a vehicle comprising the steps of providing a vehicle to be dried, said vehicle being elongated with a front end, a rear end, a top surface and side surfaces extending adjacent to said top surface from said front end to said rear end, providing three blowers with nozzles mounted above said vehicle in a position to blow air in a predetermined direction onto the top and sides of said vehicle, two of said blowers being side blowers and being positioned on opposite sides of a longitudinal centerline of said vehicle extending from the front end to the rear end of said vehicle, the third blower being a center blower and being positioned along said centerline of the vehicle, said blowers being mounted for linear movement along the length of said vehicle, said side blowers being mounted in substantially vertical alignment with an associated side of said vehicle to direct masses of air downwardly onto said vehicle as said blowers are moved relative to said vehicle along the length thereof and at a selected angle to said longitudinal centerline, said nozzles being pivotally mounted on their associated blowers for pivotal movement about a substantially horizontal axis, said side blowers being pivotal about said horizontal axis in a vertical plane forming an angle in the range of 55° to 65° relative to said longitudinal centerline and being pivotally movable between a position wherein they direct air substantially vertically downwardly and a position wherein they direct air downwardly at an angle in the range of 20° to 30° relative to vertical, said axis for said center nozzle extending perpendicularly to said longitudinal centerline and said center nozzle being pivotally movable between a position wherein it directs air substantially vertically downwardly and a position wherein it directs air downwardly at an angle in the range of 10° to 20° relative to vertical and along said centerline, establishing relative movement of said blowers in a first longitudinal direction along the length of said vehicle while having the side nozzles pivoted in the range of 20° to 30° relative to vertical and in the direction of movement of the blowers and the center nozzle pivoted in the range of 10° to 20° relative to vertical and in the direction of movement of the blowers, and establishing relative movement of said blowers in a second opposite longitudinal direction along the length of said vehicle while having all the nozzles directed substantially vertically downwardly.

10. The method of claim 9 wherein said vertical plane in which the side blowers pivot forms an angle of substantially 60° relative to said longitudinal centerline.

11. The method of claim 10 wherein said side nozzles are angled substantially 25° relative to vertical when said blowers are moved in said first longitudinal direction.

12. A method of drying the exterior surface of a vehicle comprising the steps of:

providing a vehicle to be dried, said vehicle being elongated with a front end, a rear end, a top surface and side surfaces extending adjacent to said top surface from said front end to said rear end, providing three blowers with nozzles mounted above said vehicle in a position to blow air in a predetermined direction onto the top and sides of said vehicle, two of said blowers being side blowers and being positioned on opposite sides of a longitudinal centerline of said vehicle extending from the front end to the rear end of said vehicle, the third blower being a center blower and being positioned along said centerline of the vehicle, said blowers being mounted for linear movement along the length of said vehicle, said side blowers being mounted in substantially vertical alignment with an associated side of said vehicle to direct masses of air downwardly onto said vehicle as said blowers are moved relative to said vehicle along the length thereof and at a selected angle to said longitudinal centerline, said nozzles being pivotally mounted on their associated blowers for pivotal movement about a substantially horizontal axis, said side nozzles pivoting in a vertical plane forming an angle in the range of 55° to 65° relative to said longitudinal centerline and being pivotally movable between a position wherein they direct air substantially vertically downwardly and a position wherein they direct air downwardly at an angle in the range of 20° to 30° relative to vertical, said axis of said center nozzle extending perpendicularly to said longitudinal centerline and said center nozzle be pivotally movable between a position wherein it directs air downwardly in a first longitudinal direction at an angle in the range of 10° to 20° relative to vertical and along said centerline and a second position wherein it directs air downwardly in a second longitudinal direction opposite to said first longitudinal direction at an angle in the range of 10° to 20° relative to vertical and along said centerline, establishing relative movement of said blowers in said first longitudinal direction while having the side nozzles pivoted in the range of 55° to 65° relative to said longitudinal centerline and 20° to 30° relative to vertical and in the direction of movement of the blowers and the center nozzle pivoted in the range of 10° to 20° relative to vertical and in the direction of movement of the blowers, and establishing relative movement of said blowers in said second longitudinal direction while having the side nozzles directed substantially vertically downwardly and the center nozzle pivoted in the range of 10° to 20° relative to vertical and in the direction of movement of the blowers.

13. The method of claim 2 wherein said center nozzle is pivoted to an angle of substantially 12.5° relative to vertical in both longitudinal directions of movement and said side nozzles are pivoted to an angle of substantially 60° relative to said longitudinal centerline and 25° relative to vertical when moved in said first longitudinal direction.

* * * * *

UNITED STATES PATENT AND TRADEMARK OFFICE
CERTIFICATE OF CORRECTION

PATENT NO. : 6,842,997 B1
DATED : January 18, 2005
INVENTOR(S) : Daniel A. Fratello and Dennis McCadden It is certified that error appears in the above-identified patent and that said Letters Patent is hereby corrected as shown below:

Title page,
Item [75], Inventors, delete "Tuan Truong, Denver, CO (US)"; and Column 14,
Line 4, delete "2" and insert -- 20 --.

Signed and Sealed this

Twenty-sixth Day of April, 2005

JON W. DUDAS
*Director of the United States Patent and Trademark Office*